(12) United States Patent
Holifield et al.

(10) Patent No.: US 12,061,307 B2
(45) Date of Patent: Aug. 13, 2024

(54) SYSTEMS AND METHODS FOR WEAPON AND DESTRUCTIVE DEVICE DETECTION BASED ON ELECTROMAGNETIC FIELD PROFILE

(71) Applicant: SoundThinking, Inc., Fremont, CA (US)

(72) Inventors: Gregory Alton Holifield, Eustis, FL (US); Timothy Alton Holifield, Eustis, FL (US); Lawrence Edward Stallman, Phoenix, AZ (US)

(73) Assignee: SoundThinking, Inc., Fremont, CA (US)

( * ) Notice: Subject to any disclaimer, the term of this patent is extended or adjusted under 35 U.S.C. 154(b) by 250 days.

(21) Appl. No.: 17/419,334

(22) PCT Filed: Jan. 27, 2020

(86) PCT No.: PCT/US2020/015136
§ 371 (c)(1),
(2) Date: Jun. 29, 2021

(87) PCT Pub. No.: WO2020/209923
PCT Pub. Date: Oct. 15, 2020

(65) Prior Publication Data
US 2022/0082721 A1    Mar. 17, 2022

Related U.S. Application Data

(60) Provisional application No. 62/797,341, filed on Jan. 27, 2019.

(51) Int. Cl.
*G01V 3/08*    (2006.01)
*G01V 3/10*    (2006.01)
(Continued)

(52) U.S. Cl.
CPC ............... *G01V 3/081* (2013.01); *G01V 3/10* (2013.01); *G06V 10/764* (2022.01);
(Continued)

(58) Field of Classification Search
CPC ........ G01V 3/081; G01V 3/10; G06V 10/764; G06V 20/647; G08B 21/182; H04N 23/61
See application file for complete search history.

(56) References Cited

U.S. PATENT DOCUMENTS 4,068,164 A  *  1/1978  Schwartz ................. G01V 3/15
                                                           324/253
5,552,705 A  *  9/1996  Keller ..................... G06V 10/255
                                                           324/243
(Continued)

FOREIGN PATENT DOCUMENTS

WO        2020087019 A1    4/2020

OTHER PUBLICATIONS

PCT International Search Report for corresponding PCT International Patent Application No. PCT/US2020/015136.
(Continued)

*Primary Examiner* — Paresh Patel
(74) *Attorney, Agent, or Firm* — Greenberg Traurig, LLP

(57) ABSTRACT

Systems and methods for weapon and destructive device detection based on electromagnetic field profile are disclosed herein. According to an aspect, a system includes one or more sensors configured to detect an electromagnetic field of one or more objects and to output an electrical signal representative of the electromagnetic field. The system also includes a computing device operably connected to the one or more sensors. Further, the computing device is configured to receive the electrical signal. The computing device is also configured to determine whether each of the one or more objects meets a predetermined electromagnetic field profile
(Continued)

based on the electrical signal. Further, the computing device is configured to present a notification to a user in response to determining that one of the objects meet the predetermined electromagnetic field profile.

24 Claims, 12 Drawing Sheets

(51) Int. Cl.
    *G06V 10/764*      (2022.01)
    *G06V 20/64*      (2022.01)
    *G08B 21/18*      (2006.01)
    *H04N 23/61*      (2023.01)

(52) U.S. Cl.
    CPC ......... *G06V 20/647* (2022.01); *G08B 21/182* (2013.01); *H04N 23/61* (2023.01)

(56) References Cited

U.S. PATENT DOCUMENTS

| | | | | |
|---|---|---|---|---|
| 5,601,081 A * | 2/1997 | Tomita | ................... | A61B 5/245 |
| | | | | 324/260 |
| 6,150,810 A * | 11/2000 | Roybal | ................. | G01V 3/087 |
| | | | | 340/568.1 |
| 6,841,994 B1 * | 1/2005 | Wiegert | ................... | G01V 3/15 |
| | | | | 324/244 |
| 7,038,458 B1 * | 5/2006 | Wiegert | ................. | G01V 3/081 |
| | | | | 324/345 |
| 2001/0029433 A1 * | 10/2001 | Scott | ................... | G01R 31/1272 |
| | | | | 702/58 |
| 2004/0012494 A1 | 1/2004 | Lee | | |
| 2005/0182590 A1 | 8/2005 | Kotter et al. | | |
| 2008/0084301 A1 * | 4/2008 | Roybal | ................... | G01V 3/38 |
| | | | | 340/551 |
| 2008/0117044 A1 | 5/2008 | Hibbs | | |
| 2011/0167936 A1 | 7/2011 | Sagi-Dolev | | |
| 2015/0379356 A1 | 12/2015 | Nikolova et al. | | |
| 2018/0168508 A1 * | 6/2018 | Biel | ..................... | A61B 5/6843 |

OTHER PUBLICATIONS

PCT Written Opinion for corresponding PCT International Patent Application No. PCT/US2020/015136.

Examination Report from associated United Kingdom Application No. GB2112194.2 dated May 12, 2022 (4 pages).

* cited by examiner

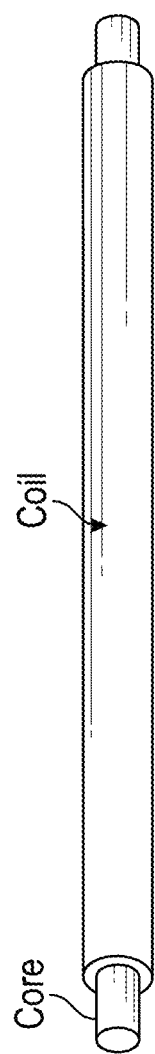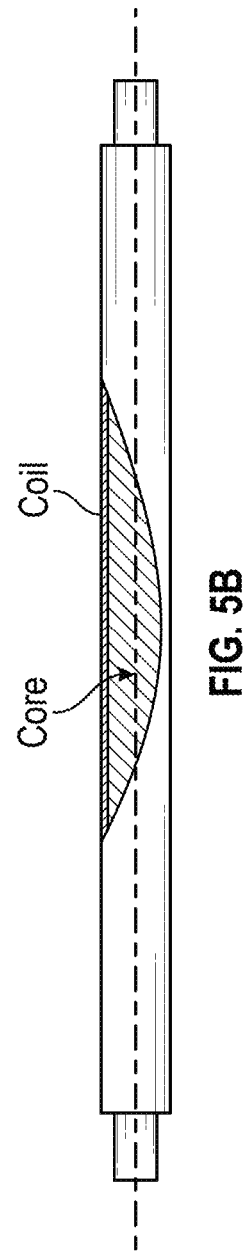

Sensor A            Sensor B
 
←——— Entryway ———→
FIG. 6

SYSTEMS AND METHODS FOR WEAPON AND DESTRUCTIVE DEVICE DETECTION BASED ON ELECTROMAGNETIC FIELD PROFILE

CROSS REFERENCE TO RELATED APPLICATIONS

This is a national phase application of PCT Application No. PCT/US2020/015136, filed Jan. 27, 2020, and titled SYSTEMS AND METHODS FOR WEAPON AND DESTRUCTIVE DEVICE DETECTION BASED ON ELECTROMAGNETIC FIELD PROFILE, which claims priority to U.S. Patent Application No. 62/797,341, filed Jan. 27, 2019, and titled WEAPON DETECTION BASED ON MOVING MAGNETIC SIGNATURES; the contents of which are incorporated herein by reference in their entireties.

TECHNICAL FIELD

The presently disclosed subject matter relates generally to security systems. Particularly, the presently disclosed subject matter relates to systems and methods for weapon and destructive device detection based on electromagnetic field profile.

BACKGROUND

In secured environments, such as aviation security and checkpoints, security systems are commonly used for detecting weapons and destructive devices, such as rifles, handguns, and improvised explosive devices (IEDs). However, such detection can be a challenge. Usually, detection can be a challenge due to the high number of people moving through these areas and because weapons and destructive devices have characteristics that are similar to common, harmless items that people normally carry such as smartphones, keys, computers, and coins. For example, these items commonly have metallic components and can have a size and shape similar to weapons and destructive devices. Thus it can be difficult for security systems to distinguish between these items such that authorized personnel can be notified.

In view of the foregoing difficulties and the high importance of detecting weapons and destructive devices, there is a continuing need to develop improved systems and techniques for detecting weapons and destructive devices and for notifying authorities of their detection.

BRIEF DESCRIPTION OF THE DRAWINGS

Figure 1:
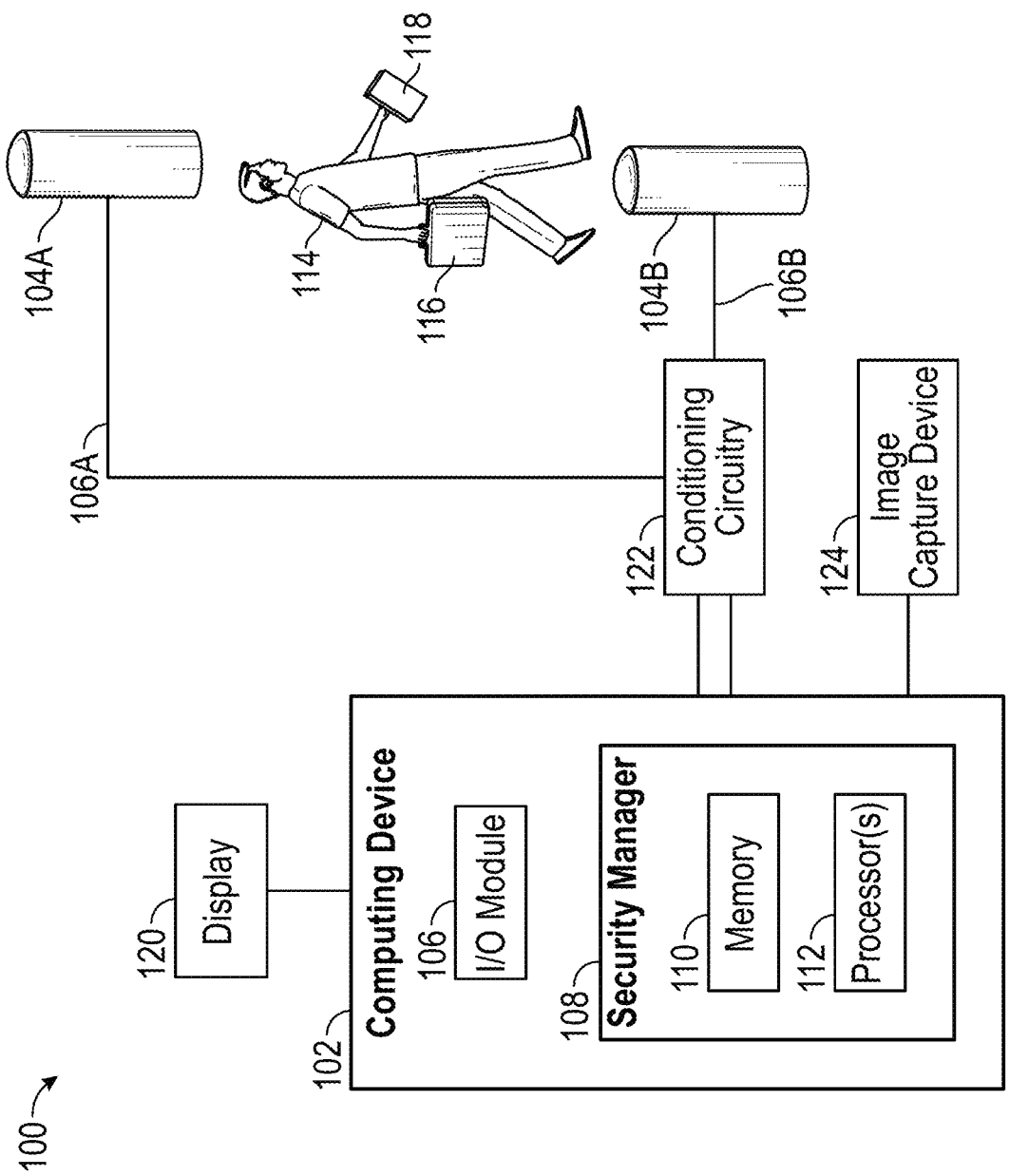
Figure 2:
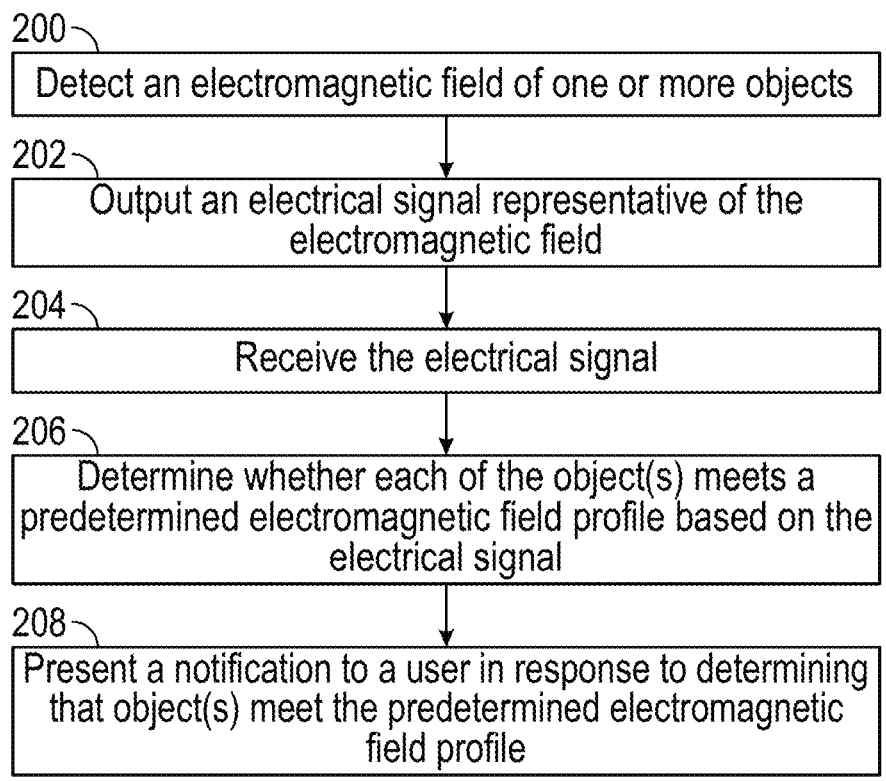
Figure 3:
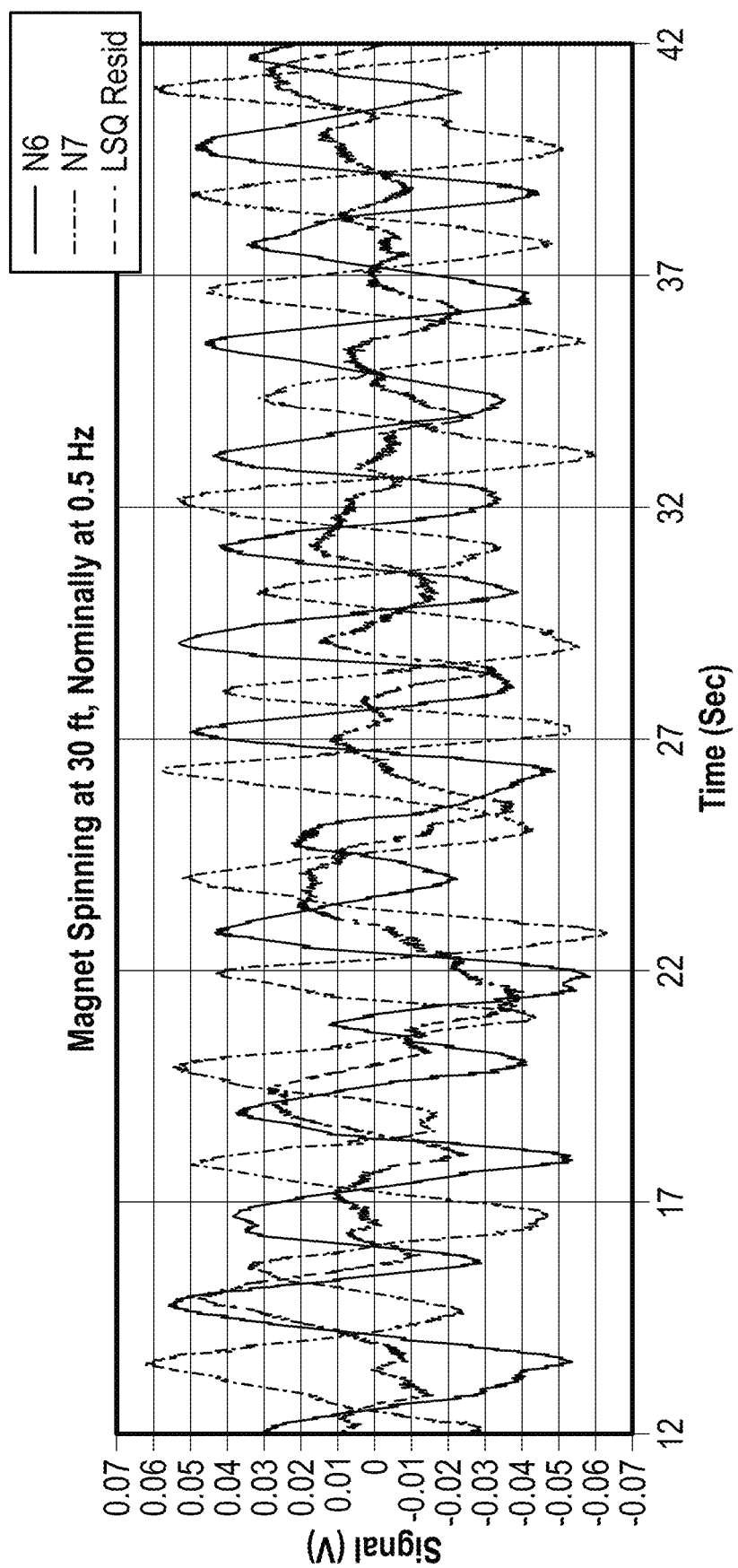
Figure 4:
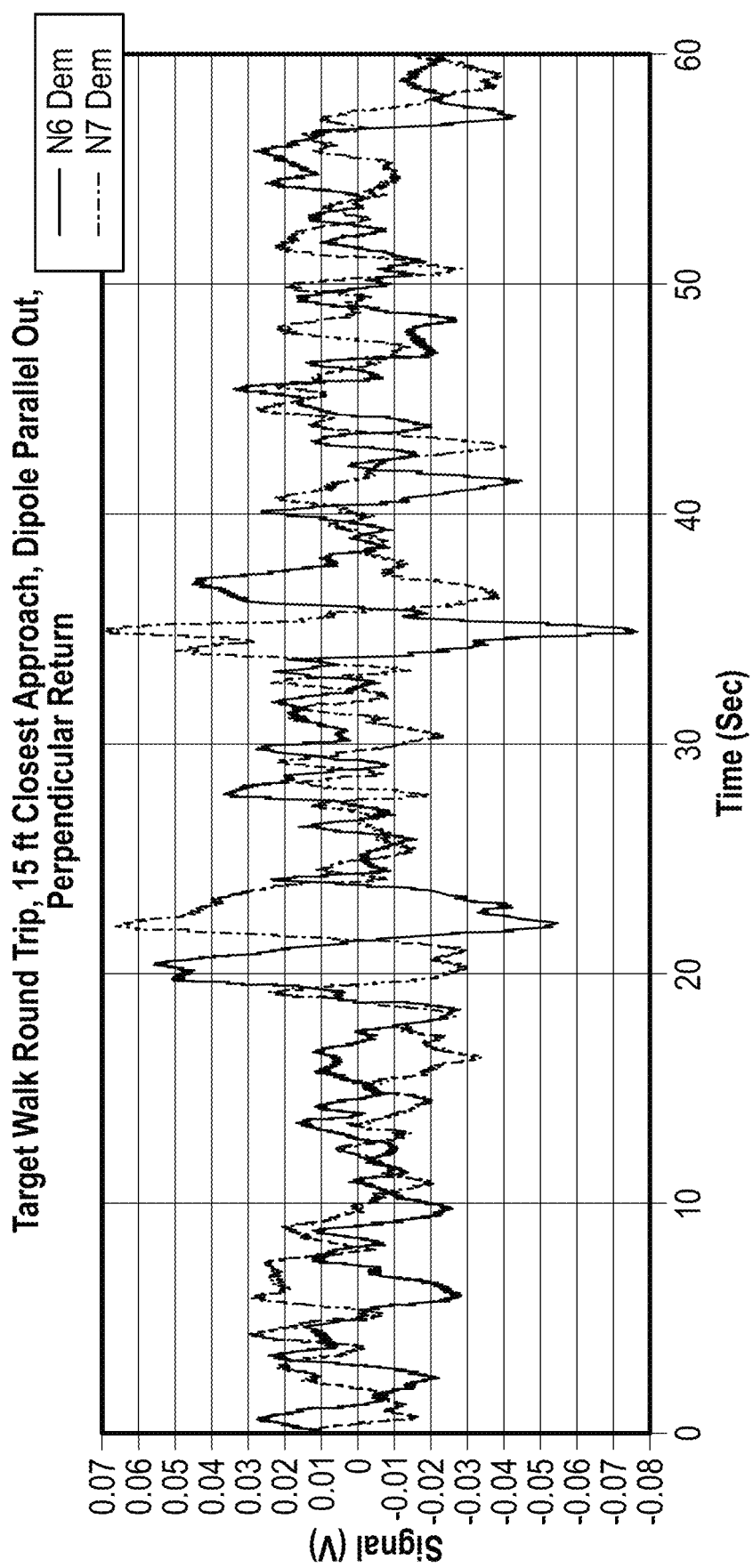
Figure 11:
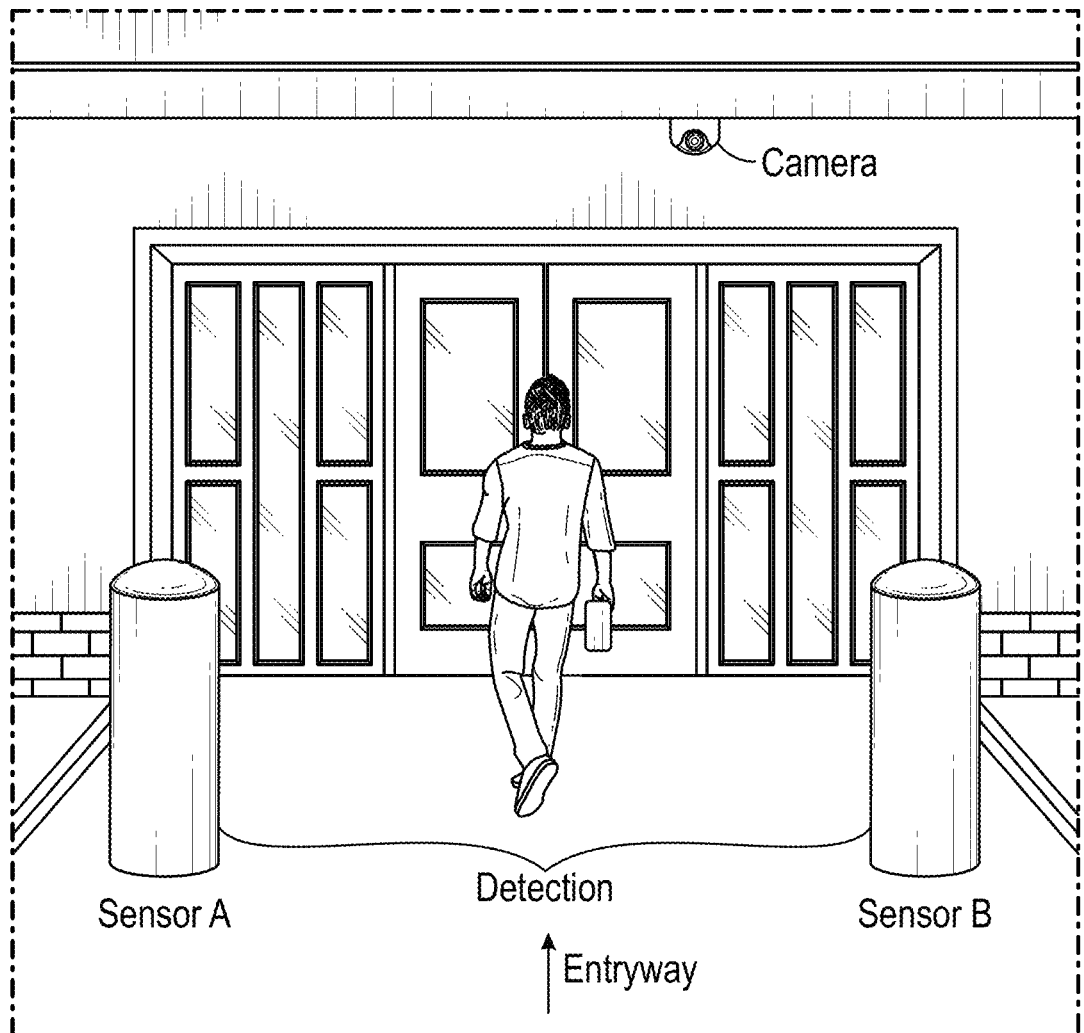
Figure 12:
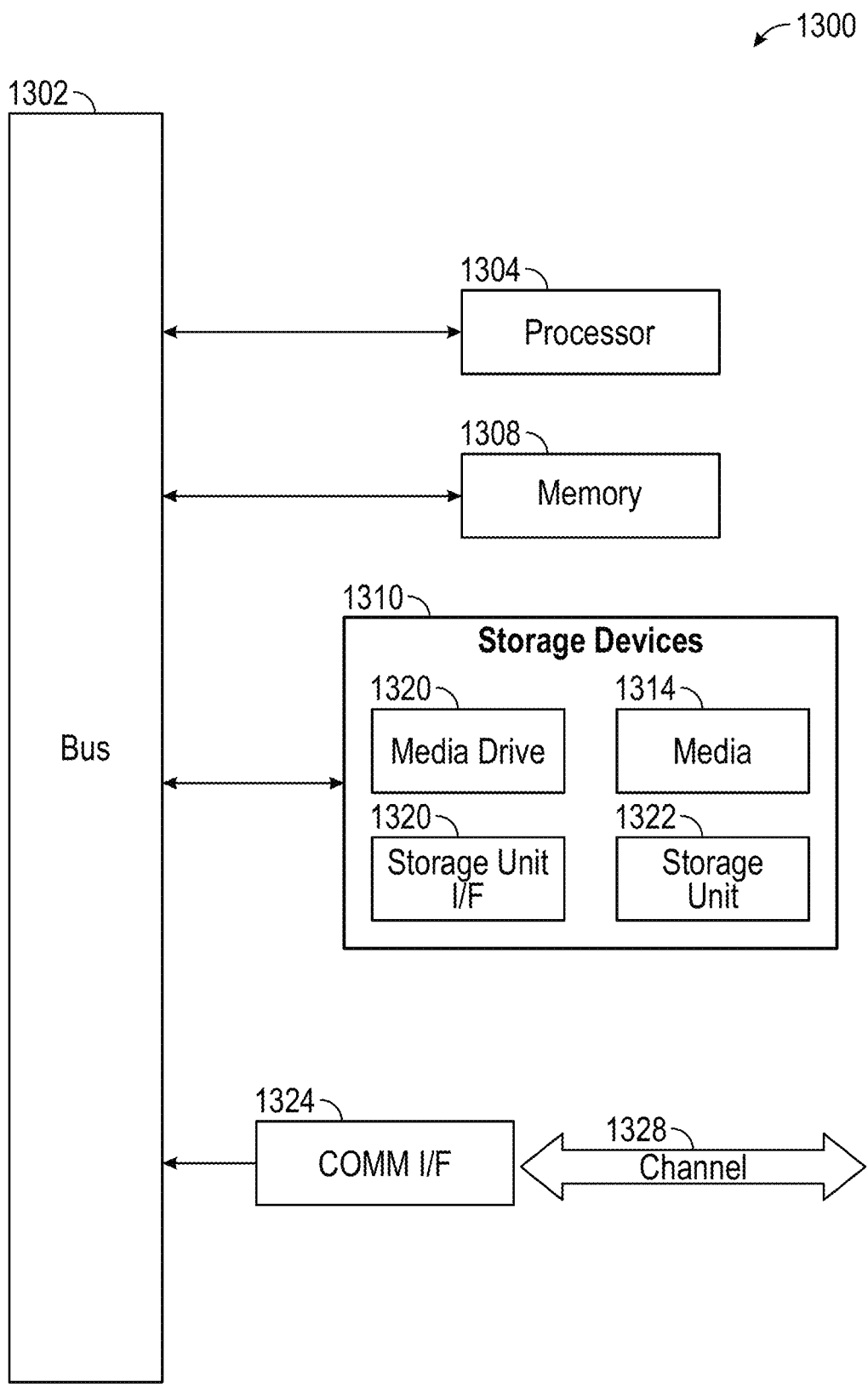

Having thus described the presently disclosed subject matter in general terms, reference will now be made to the accompanying Drawings, which are not necessarily drawn to scale, and wherein:

FIG. 1 is a diagram of a system for weapon and destructive device detection based on electromagnetic field profile in accordance with embodiments of the present disclosure;

FIG. 2 is a flowchart of an example method for detecting weapons and destructive devices based on electromagnetic field profiles in accordance with embodiments of the present disclosure;

FIG. 3 is a graph showing a signal of a test magnet being rotated end-over-end to produce an oscillating signal at a distance of 9.2 m from two induction-coil sensors, along with the residual obtained by least squares subtraction of one sensor output from the other;

FIG. 4 is a graph that shows the signal from the same magnet being carried twice past the sensors at a brisk walking pace, with the distance at closest approach being 4.7 m;

FIGS. 5A and 5B illustrate a side perspective view and a side view, respectively, of an example solenoid coil with a high permeability core that may be used as a sensor in accordance with embodiments of the presently disclosed subject matter;

FIGS. 6-10 are different views of example configurations of weapon and destructive device detection system in accordance with embodiments of the present disclosure;

FIG. 11 is a diagram of an example configuration for entryway security in accordance with embodiments of the present disclosure; and FIG. 12 is a block diagram of an example system 1300 for implementing functionality described herein.

SUMMARY

The presently disclosed subject matter relates to systems and methods for weapon and destructive device detection based on electromagnetic field profile. According to an aspect, a system includes one or more sensors configured to detect an electromagnetic field of one or more objects and to output an electrical signal representative of the electromagnetic field. The system also includes a computing device operably connected to the one or more sensors. Further, the computing device is configured to receive the electrical signal. The computing device is also configured to determine whether each of the one or more objects meets a predetermined electromagnetic field profile based on the electrical signal. Further, the computing device is configured to present a notification to a user in response to determining that one of the objects meet the predetermined electromagnetic field profile.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

FIG. 1 illustrates a diagram of a system 100 for weapon and destructive device detection based on electromagnetic field profile in accordance with embodiments of the present disclosure. Referring to FIG. 1, the system 100 includes a computing device 102 and sensors 104A and 104B. The computing device 102 may be operably connected to sensors 104A and 104B via respective cables 106A and 106B, respectively. Alternatively, the computing device 102 may be connected to sensors 104A and 104B via any other suitable wired connection or wireless connection. It is also noted that although two sensors 104A and 104B are shown in the figure, it should be understood that there may be any suitable number of sensors operably connected to the computing device 102 by any suitable communication technique, and in any suitable configuration or arrangement in accordance with embodiments of the present disclosure.

The computing device 102 may include an input/output (I/O) module 106 configured to communicatively interface with the sensors 104A and 104B. for example, the I/O module 106 may be a wire end interface or a wireless communications module for communicating with sensors 104A and 104B. Further, the I/O module 106 may receive the electrical signals from the sensors 104A and 104B and convert the electrical signals to data for use by the computing device in accordance with embodiments of the present disclosure.

With continuing reference to FIG. 1, the sensors 104A and 104B may each be configured to detect an electromagnetic field of nearly objects and to each output an electrical signal representative of the detected electromagnetic field. The computing device 102 may be configured to receive the electrical signal(s) from each sensor 104A and 104B, to determine whether object(s) meet a predetermined electromagnetic field profile based on the electrical signal(s), and to present a notification to a user in response to determining that an object meets the predetermined electromagnetic field profile. These functionalities and other functionalities in accordance with embodiments of the present disclosure may be implemented by a security manager 108. The security manager 108 may include hardware, software, firmware, or combinations thereof for implementing the functionalities described herein. For example, the security manager 108 may include memory 110 and one or more processors 112.

In accordance with embodiments, the sensors 104A and 104B may be any suitable type of sensor for detecting a magnetic field generated by an object in proximity. As an example, the sensors 104A and 104C may include induction coils. Further, the induction coils may each include either an air core or a high permeability core. In examples, each induction coil may include a core made of low carbon steel, ferrite, an alloy of nickel-iron, an alloy of boron-iron-silicon, or combinations thereof. Further, the sensors 104A and 104B may comprise a pair of solenoids. In yet other examples, the sensors 104A and 104B may be two or more sensors configured to detect magnetic flux of objects in different orientations. In other examples, the sensors 104A and 104B comprise a three-axis gradiometer. An output of the sensors 104A and 104B may be electrical signals representative of a detected magnetic flux.

FIG. 2 illustrates a flowchart of an example method for detecting weapons and destructive devices based on electromagnetic field profiles in accordance with embodiments of the present disclosure. The method is described by example as being implemented by the system 100 shown in FIG. 1, although it should be appreciated that the method may be implemented by any suitable system including sensors operable to detect electromagnetic fields.

Referring to FIG. 2, the method includes detecting 200 an electromagnetic field of one or more objects. For example, a person 114 may walk in proximity to the sensors 104A and 104B and may carry objects 116 and 118. The objects 116 and 118 are depicted as being carried in the person's 114 hands. Alternatively, for example, the objects may be contained in a bag, briefcase, luggage, or the like carried by the person 114. In this particular example, the object 116 is a briefcase, which is holding one or more objects. The object 118 is a smartphone in this example. The objects 116 and 118 may produce magnetic fields that are detectable by the sensors 104A and 104B when the objects and sensors are in sufficiently close proximity. Example objects also include, but are not limited to, weapons and destructive devices such as handguns, IEDs, rifles, knives, and the like.

The method of FIG. 2 includes outputting 202 an electrical signal representative of the electromagnetic field. Continuing the aforementioned example, the sensors 104A and 104B can each output electrical signals that are representative of the objects 116 and 118. Further, the sensors 104A and 104B can each output electrical signals that are representative of the magnetic fields of any objects contained in object 116 and/or other nearby objects.

The method of FIG. 2 includes receiving 204 the electrical signal. Continuing the aforementioned example, the I/O module 106 of the computing device 102 may receive the electrical signal from each sensor 104A and 104B and store a representation of the detected magnetic fields of objects 116 and 118 in memory 110 of the security manager 108. The stored data in memory 110 may be representative of the detected magnetic fields of objects 116 and 118.

The method of FIG. 2 includes determining 206 whether each of the object(s) meets a predetermined electromagnetic field profile based on the electrical signal. Continuing the aforementioned example, the security manager 108 may determine whether a stored magnetic field of one of the objects 116 and 118 meets a predetermined magnetic field profile. As an example, the security manager 108 may store and maintain in memory 110 a library of multiple, predetermined electromagnetic field profiles. The profiles may be, for example, magnetic field profiles. The security manager 108 may use the profiles comparison to the signals representative of the magnetic field profiles of objects 116 and 118. For example, the profiles may be compared to the magnetic field profiles of the objects 116 and 118 to determine whether there is a match or whether there is sufficient similarity to deduce that one of the objects 116 and 118 is a weapon or destructive device or may be a weapon or destructive device.

It is noted that the steps of detecting 200, outputting 202, receiving 204, and determining 206 can be continuously, periodically, or regularly implemented. This is so that the system 100 can continuously or regularly check as objects pass by the sensors 104A and 104B. This can be advantageous in a secured environment or checkpoint.

The method of FIG. 2 includes presenting 208 a notification to a user in response to determining that object(s) meet the predetermined electromagnetic field profile. Continuing the aforementioned example, the security manager 108 may control a display 120 to display a notification to a user to indicate that one of the objects 116 and 118 meets one of the stored magnetic field profiles. For example, one of the profiles may be for a handgun. In this instance, if one of the objects 116 and 118 is a handgun, then there may be match to a stored profile, and the display 120 may be controlled to notify a user of the match such that security action may be effected. The notification may be a warning to the user. In another example, any suitable user interface may be controlled for notifying a user of a match to a stored profile.

In accordance with embodiments, the system 100 shown in FIG. 1 may include conditioning circuitry 122 configured to condition electrical signals output by the sensors 104A and 104B. For example, the conditioning circuitry 122 may condition the electrical signals such that they are suitable for receipt by the I/O module 106 of the computing device. Further, for example, the conditioning circuitry 122 may include a frequency filter configured to entirely or at least substantially remove electrical signals from output by the sensors 104A and 104B that are outside a predetermined range of frequencies. For example, the frequency ranges filtered by the frequency filter may include frequencies outside of the expected frequency ranges of magnetic fields of objects of interest, such as weapons and destructive devices.

In accordance with embodiments, the system 100 shown in FIG. 1 may include an image capture device 124 operably connected to the computing device 102 or another electronic device. The image capture device 124 may be positioned to capture images and/or video of objects (e.g., the person 114 and objects 116 and 118) positioned in proximity to the sensors 104A and 104B. Data of the capture images and/or video may be communicated to the computing device 102 and/or another electronic device. In this example, the image capture device 124 is communicatively connected to the computing device 102 such that the captured images and/or video data may be communicated to the computing device and stored in memory 110 by the security manager 108. The security manager 108 may be configured to control the image capture device to capture an image and/or video of the object(s) in its field-of-view (FOV) in response to a determination that a representation of the electromagnetic field of the object(s) meets a predetermined electromagnetic field profile in accordance with embodiments disclosed herein. In this way, images and/or video of the objects or the scene may be captured when, for example, there is a determination that an object may be a weapon or destructive device.

In accordance with embodiment of the present disclosure, systems and methods are disclosed for classifying magnetic signatures or profiles of weapons and destructive devices and for discerning those from spurious signals. The term "weapon" in the context of the disclosure may include, but is not limited to, handguns, rifles, machine guns, knives, and IEDs. An example of an IED is a pressure cooker filled with metallic sharp objects and plastic explosives. In an example, a system may include one or more passive magnetic field measurement elements for detecting sensitive magnetic fields generated from moving and/or stationary targets. The system may also implement with a suitable computing device a detection algorithm based on the classification of magnetic signatures from targets of interest used to declare an alarm when one or more of the targets are detected. Further, the system may include a gradiometer element that effectively suppresses unwanted far field signals, reducing spurious noise. The system may also include a frequency filter that can effectively eliminate signals with frequencies outside of the expected band from the moving or stationary targets of interest. Further, the system may include collocated sensing elements arranged in one, two or three directions to measure one or more components of the varying magnetic field vector generated by moving targets. Further, the system may include a camera to generate an image of the entryway at the moment an alarm is generated. The system may also include a user interface that allows an operator to observe an image of an entryway at a time of detection. The system may also include an interconnected system that allows to transmit the alarm to one or more wired or wireless local or remote devices. The combination of the detection element, filters, and target classification algorithms can result in effective detection of pre-classified threats.

In accordance with embodiments, a system can detect weapons based on the discrimination of classified magnetic signatures from threats and background and spurious signals. For example, the system 100 shown in FIG. 1 may have this functionality. It is noted that a detection element (or sensors) can be sensitive to natural background noises. The reference sensitive level of the disclosed system can be the background noise at the frequency of interest. The weapon magnetic signatures, the noise sources and the detection algorithms are described below.

The detection of threats (i.e., the detection of weapons and/or destructive devices) may be based on the pre-classified or predetermined magnetic signatures (or profiles) from moving weapons such as rifles and IEDs. The system may discriminate those from benign objects and from background ambient signals. Magnetic signals arise from metallic objects of interest carried by people. These include handguns and larger weapons, as well as IEDs, tools and other objects. As an example, the magnetic signatures of several pistols may be classified as a marker or indicator of the signals to be detected against naturally and manmade occurring spurious signals. As an example, a pistol can produce a magnetic field of approximately 280 picotesla (pT) at a range of 5 meters. It is noteworthy that even most supposedly non-ferrous guns, such as titanium pistols, can contain ferromagnetic steel components (liners of the firing chamber and, sometimes, the barrel) that yield a magnetic signal detectable by system in accordance with embodiments disclosed herein. As a reference, a minimum signal to noise ratio of 4:1 may be specified to provide a high probability of detection. This can motivate selection of, for example, 70 pT/Hz1/2 as an indicator of sensor noise floor target. Modeling the target or object as a magnetic dipole and calculating the multidirectional evolution of the signal as the target is carried past a sensor can enable estimation of the frequency band containing the signal.

In accordance with embodiments, bandpass filtering can be used to filter natural geomagnetic fluctuations, cultural noise, noise from sensor motion, and the like. For example, the conditioning circuitry 112 may be suitably configured with one or more filters (e.g., a bandpass filter) to filter these noises ahead of them reaching the computing device 102. Example geomagnetic fluctuations include geomagnetic pulsations (e.g., Classes Pc3, Pc4, and Pc5). Example cultural noises include powerline noise, vehicle noise (e.g., automobile noise), construction activity, and the like. In accordance with embodiments, far fields may be suppressed using an inductive sensor pair (gradiometer) in addition to profiles disclosed herein. Further, for example, cultural noise may be suppressed with a pair of coils collecting magnetic flux with opposite currents. This can passively suppress far fields while still being effective at detecting signals that are of the order of one to a few times the separation of two "opposite" detection elements.

It is noted that variations in inductive coil orientation or other sensor configurations can generate noise. At a sensor noise floor of 70 pT, an angular motion of 1.4 microradians in the Earth's field (about 50 microT) can produce a transient fluctuation in the sensor's output that is comparable in magnitude to sensor noise. Since the disclosed sensors such as induction coils have zero sensitivity at DC, there is no change in baseline level, only a transient. In this example a bandpass filter or other suitable conditioning circuit may reduce or eliminate this sensor noise.

In accordance with embodiments, fully tracking and characterizing magnetic dipole targets or objects can require measuring six parameters as a function of time: the three components of its position vector r and the three components of its magnetic moment vector M. Determining M can be a key to characterizing and categorizing a target or object. Doing so can require a minimum of six independent measurements. In practice, multiple solutions exist when only six measurements are available, and it can take a few more to eliminate them. Measuring all three vector components of the magnetic field at one location may be inadequate to specify dipole magnitude and location. The magnetic field's gradient tensor $\mu B_i/\mu x_j$ (i,j=1,2,3) has nine components. Maxwell's Equations indicate that only five of those components are independent. Measuring the gradient tensor at two locations, or measuring the field and gradient at a single location, can suffice to locate and characterize the target unambiguously. A magnetic measure that provides an unambiguous, monotonic closer-farther signal is the scalar magnitude of the gradient tensor (the Pythagorean sum of all nine components). A single or a set of magnetic flux sensing elements is sufficient for the threat detection modality. A second consideration in target detection is that, since the signal is not a repeating one, techniques like signal averaging to improve signal to noise ratio (SNR) are not easily usable. FIG. 3 is a graph showing a signal of a test magnet being rotated end-over-end to produce an oscillating signal at a distance of 9.2 m from two induction-coil sensors, along with the residual obtained by least squares subtraction of one sensor output from the other. The quasi-periodic signal may be detected with a signal-to-noise ratio (SNR) of somewhat less than 2. FIG. 4 is a graph that shows the signal from the same magnet being carried twice past the sensors at a brisk walking pace, with the distance at closest approach being 4.7 m. The target signal is detected with an SNR of approximately 2, despite the much smaller range to the target that can yield substantially higher SNR. A suitable signal conditioning technique implemented by the conditioning circuitry 122 shown in FIG. 1 can allow for increased detection performance.

As an example of a detection algorithm, it can be assumed that a magnetic flux detection element is oriented along the x-axis of a coordinate system whose other horizontal axis is y, with z being vertical. The sensor's output is band-pass filtered in the anticipated signal band of interest. In some embodiments, the sensor output taken over a sliding window of a length of time is subsequently passed through a detector to determine if there is a potential signal of interest. In some embodiments, this may include image processing for motion detection to reduce false alarm from environmental noise.

One or more sensor outputs from sensors 104A and 104B taken over a sliding window of a length in time may subsequently be evaluated by the security manager 108 using machine classification algorithms, such as but not limited to, linear regression, logistics regression, Naive Bayes, k-means, k-nearest neighbor, support vector machines, neural networks, or the like. These comparative classifier values may be generated by the security manager 108 using any one of several machine learning techniques with data taken with threat devices (e.g., guns, knives, improvised explosives, etc.), as well as clear signals and distractors, such as common clutter (cell phones, keys, coins, wallets, purses, tablets, laptops, musical instruments, luggage, strollers, etc.). The output of the classification algorithms can come in several forms, including, but not limited to, identification of threat vs non-threat, identification of a particular threat or non-threat target, and/or a confidence level from the algorithm.

A multi-directional sensor may be configured in a way that various magnetic moment components are detected. This enables an estimate of the target's magnetic moment. Having approximately constrained the object's moment and direction, the characteristic frequency can provide an approximate measure of the target's speed. Having the peak magnitude information can refine the processing by providing a field profile that can, for instance, help distinguish between a single dipole-like target and a collection of many dipoles (e.g., a group of people each carrying handguns).

The result of the classification algorithm may subsequently trigger an alarm or alert to be sent to an operator. In some embodiments, notification or instruction to trigger the alarm can be communicated over a network connection and includes an alert image. At the operator's station, alarms are noted, along with the time stamp for the event, and are further processed for potential threats.

In accordance with embodiments, an induction coil may be used as a sensor to measure the magnetic flux generated by a moving target of interest. The induction coil can have an air core or a high permeability core. To achieve the sensitivity levels that approach the ambient noise with a compact sensing element, a high permeability air core solenoid may be used. The material for the core may be for example low carbon steel, ferrite, or alloys of nickel-iron or boron-iron-silicon.

FIGS. 5A and 5B illustrate a side perspective view and a side view, respectively, of an example solenoid coil with a high permeability core that may be used as a sensor in accordance with embodiments of the presently disclosed subject matter. For example, this solenoid coil may be used as one or both of the sensors 104A and 104B shown in FIG. 1. Referring to FIGS. 5A and 5B, this configuration achieves the sensitivity of the ambient noise or better in the frequency range of interest. Other sensing technologies may be utilized. For example, but not limited to, fluxgate magnetometer devices.

It is noted that the sensors disclosed herein may operate at low frequencies. Therefore, the signals are not attenuated by walls or metallic sheets. The sensors may therefore be covert (e.g., placed inside metallic or non-metallic enclosures or even hidden behind walls).

FIGS. 6-10 illustrate different views of example configurations of weapon and destructive device detection system in accordance with embodiments of the present disclosure. Referring to FIG. 6, the figure shows a view of sensors A and B positioned at sides of an entryway. In this example, the sensors A and B are solenoids. The sensors A and B can detect the flux generated by objects moving in their proximity. A person walking in between the sensors A and B with a weapon can result in detectable signals in one or both of the sensors A and B.

Figure 7:
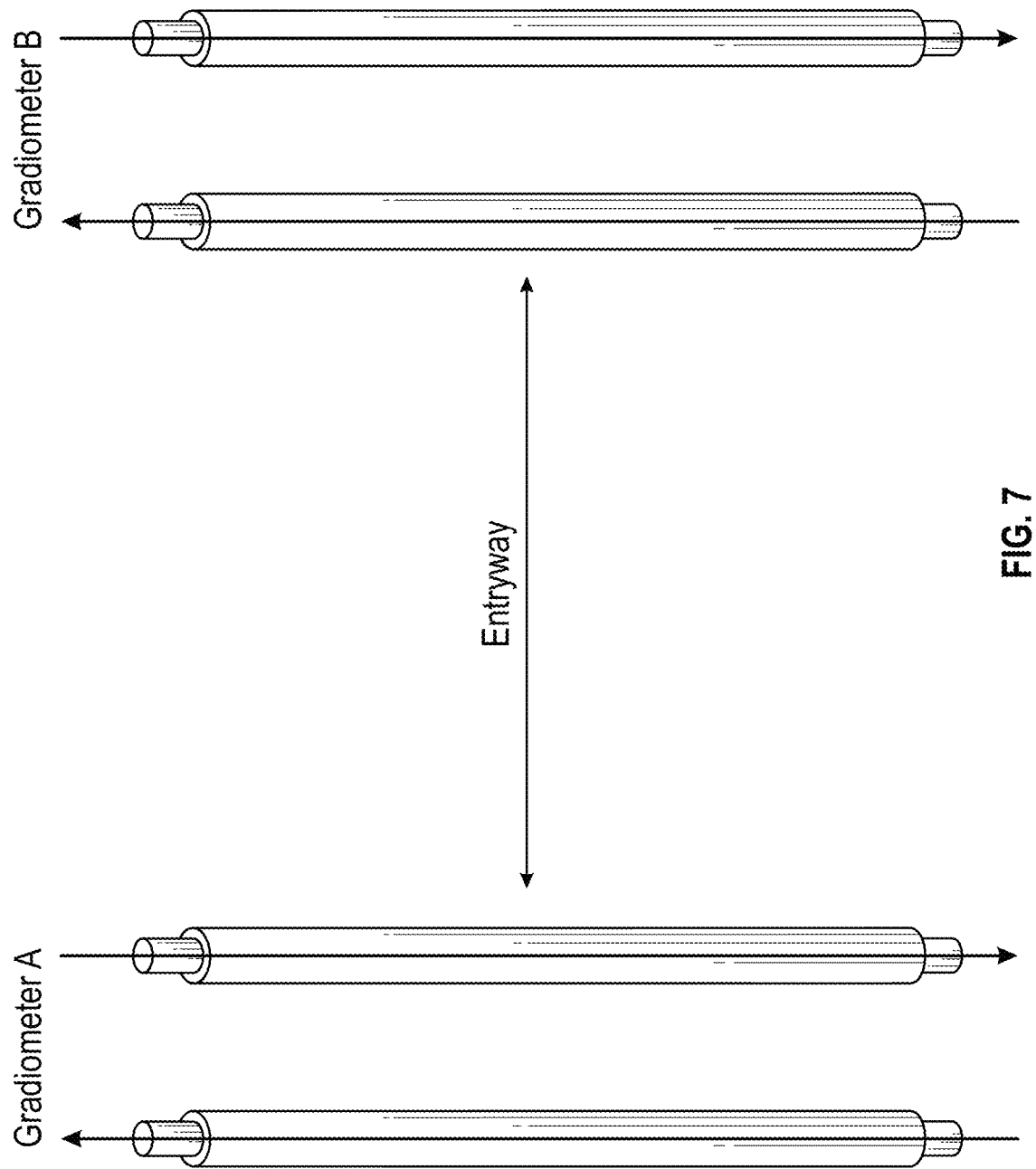

FIG. 7 shows two sensor pairs A and B with coils in each pair in opposite orientations (gradiometer). Each pair A and B is positioned at each side of an entryway. In this example, far field signals may be suppressed by using such a pair of identical sensors collecting magnetic flux in opposite orientations. The signals may be suppressed by connecting the opposite solenoids in series or by subtracting the signals collected from the two individual sensors. Signals generated at distances significantly larger than the separation of the sensors are passively and effectively suppressed. While signals in the proximity of the sensor pair are detectable, changing the separation of the sensors allows to control the sensitivity area and the degree of far field suppression.

Figure 8:
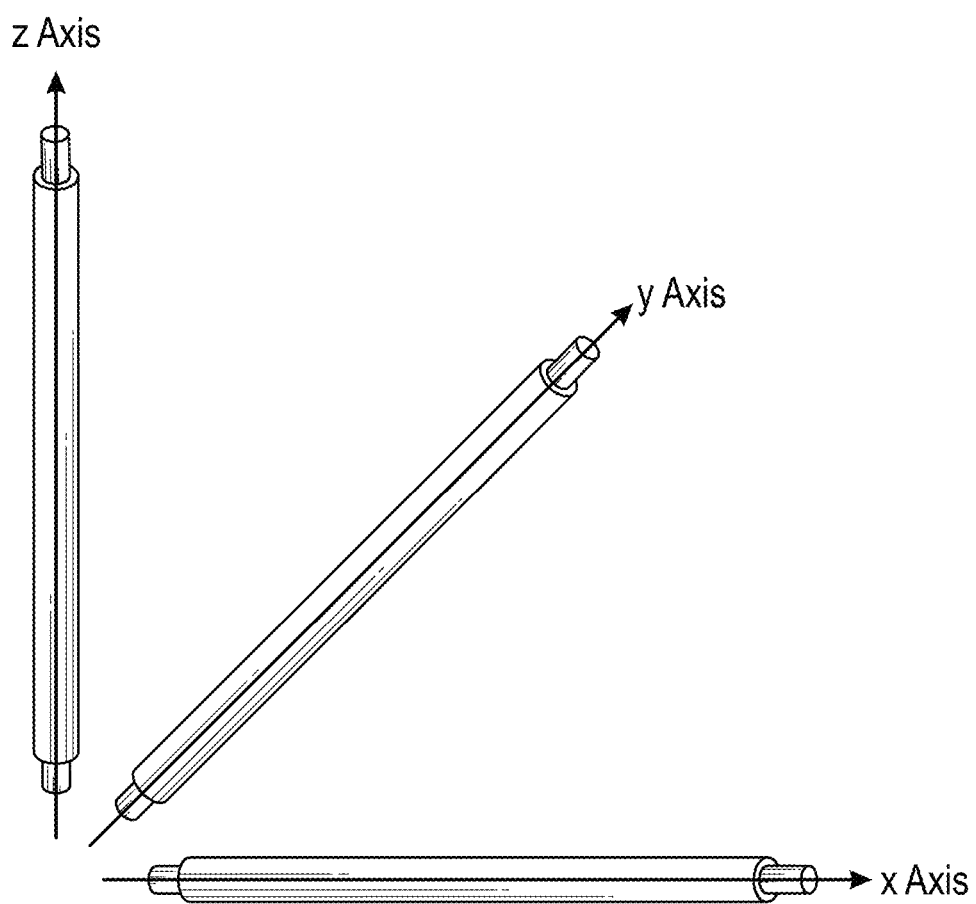

FIG. 8 shows a set of three collocated induction coils placed along the three Cartesian axes (i.e., axes x, y, and z). The multiple orientations may be used to collect components of the magnetic field flux as objects are moved in the proximity of the sensor. The signals can be exploited by the classification detection algorithms for matching to a profile to increase specificity and therefore provide high detection performance.

Figure 9:
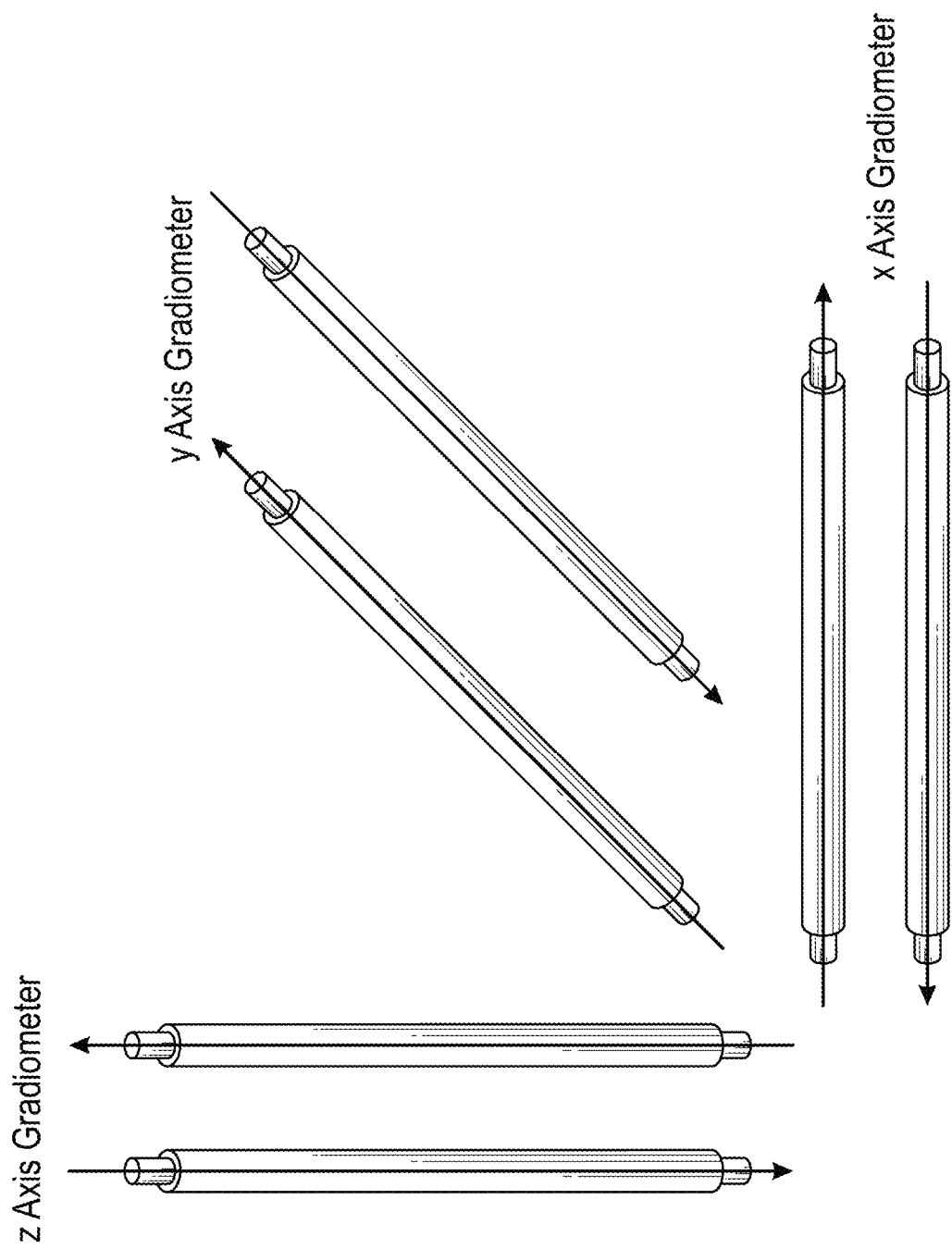

FIG. 9 shows a three-axis gradiometer. Referring to FIG. 9, each of the three collocated pairs of opposite induction coils are oriented along the Cartesian axes (i.e., axes x, y, and z).

Figure 10:
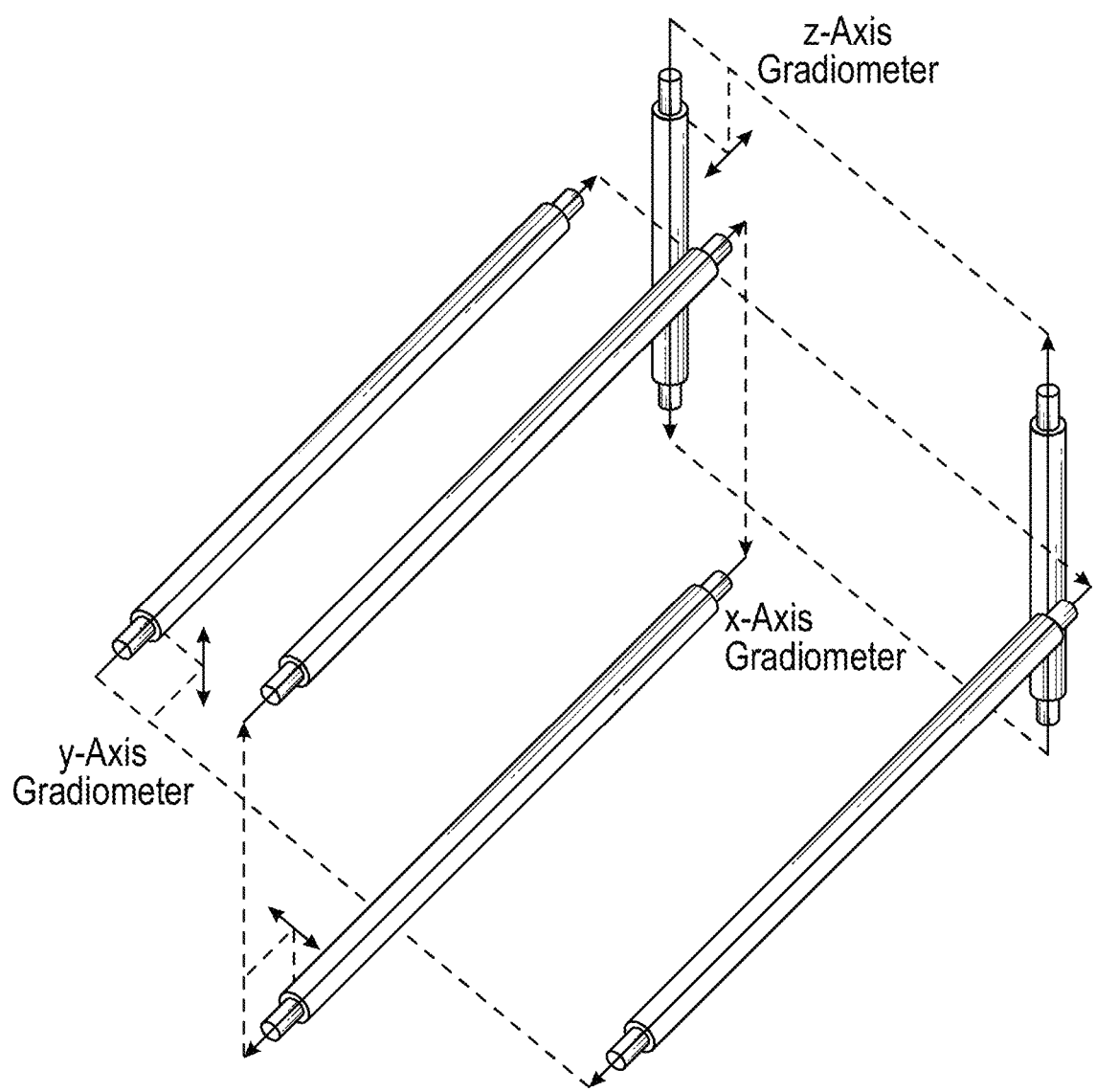

FIG. 10 shows an example distribution of pairs of coils forming a three-axis gradiometer. This sensor may, for example, be placed inside a detector box—covert or not covert.

FIG. 11 illustrates a diagram of an example configuration for entryway security in accordance with embodiments of the present disclosure. Referring to FIG. 11, each of the boxes may contain a unidirectional or multi-directional sensor A and B. The boxes are placed on the sides of the entryway. A camera can be positioned as indicated and directed to the sensitive area of the sensors A and B. Once a weapon is detected, an alarm may be generated, together with a time stamp and an image. The image can help with security measures following an alarm, showing the entryway at the instant in which the alarm was generated.

As used herein, the term logical circuit or component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component or logical circuit. In implementation, the various components or logical circuits described herein might be implemented as discrete components or the functions and features described can be shared in part or in total among one or more components or logical circuits—as represented in FIG. 12, which illustrates a block diagram of an example system 1300 for implementing functionality described herein. In other words, as would be apparent to one of ordinary skill in the art after reading this description, the various features and functionality described herein may be implemented in any given application and can be implemented in one or more separate or shared components in various combinations and permutations. As used herein, the term logical circuit may describe a collection of components configured to perform one or more specific tasks. Even though various features or elements of functionality may be individually described or claimed as separate components or logical circuits, one of ordinary skill in the art will understand that these features and functionality can be shared among one or more common software and hardware elements, and such description shall not require or imply that separate hardware or software components are used to implement such features or functionality.

Where logical circuits, components, or components of the technology are implemented in whole or in part using software, in one embodiment, these software elements can be implemented to operate with a computing or processing component capable of carrying out the functionality described with respect thereto. Various embodiments are described in terms of this example system 1300. After reading this description, it will become apparent to a person skilled in the relevant art how to implement the technology using other computing components or architectures.

Referring to FIG. 12, the system 1300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special purpose or general-purpose computing devices as may be desirable or appropriate for a given application or environment.

System 1300 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

System 1300 might include, for example, one or more processors, controllers, control components, or other processing devices, such as a processor 1304. Processor 1304 may be implemented using a general-purpose or special-purpose processing logical circuits such as, for example, a microprocessor, controller, or other control logic. In the illustrated example, processor 1304 is connected to a bus 1302, although any communication medium can be used to facilitate interaction with other components of computing component 1300 or to communicate externally.

The system 1300 may also include one or more memory components, simply referred to herein as main memory 1308. For example, random access memory (RAM) or other dynamic memory may be used for storing information and instructions to be executed by processor 1304. Main memory 1308 might also be used for storing temporary variables or other intermediate information during execution of instructions to be executed by processor 1304. Computing component 1300 might likewise include a read only memory ("ROM") or other static storage device coupled to bus 1302 for storing static information and instructions for processor 1304.

The system 1300 might also include one or various forms of information storage devices 1310, which might include, for example, a media drive 1312 and a storage unit interface 1320. The media drive 1312 might include a drive or other mechanism to support fixed or removable storage media 1314. For example, a hard disk drive, an optical disk drive, a CD or DVD drive (R or RW), or other removable or fixed media drive might be provided. Accordingly, storage media 1314 might include, for example, a hard disk, an optical disk, a CD or DVD, or other fixed or removable medium that is read by, written to or accessed by media drive 1312. As these examples illustrate, the storage media 1314 can include a computer usable storage medium having stored therein computer software or data.

In alternative embodiments, information storage mechanism might include other similar instrumentalities for allowing computer programs or other instructions or data to be loaded into the system 1300. Such instrumentalities might include, for example, a fixed or removable storage unit 1322 and an interface 1320. Examples of such storage units 1322 and interfaces 1320 can include a program cartridge and cartridge interface, a removable memory (for example, a flash memory or other removable memory component) and memory slot, a PCMCIA slot and card, and other fixed or removable storage units 1322 and interfaces 1320 that allow software and data to be transferred from the storage unit 722 to the system 1300.

The system 1300 may also include a communications interface 1324. Communications interface 1324 might be used to allow software and data to be transferred between computing component 1300 and external devices. Examples of communications interface 1324 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 1324 might typically be carried on signals, which can be electronic, electromagnetic (which includes optical) or other signals capable of being exchanged by a given communications interface 1324. These signals might be provided to communications interface 1324 via a channel 1328. This channel 1328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1308, storage unit 1320, media 1314, and channel 1328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the system 1300 to perform features or functions of the disclosed technology as discussed herein.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:
   three sets of paired sensors arranged to collect components of the magnetic field flux and form a three-axis gradiometer element that passively suppresses far field signals, wherein each paired set of the sensors collects the flux in one of each of an x-axis, a y-axis and a z-axis:
      wherein the sensors of the sensor array are configured to detect an electromagnetic field of one or more objects and to output electrical signals representative of the electromagnetic field;
      wherein each of the sensor pairs comprise a first induction coil and a second induction coil, wherein each of the induction coils are wound around a high permeability and/or air core; and wherein the first induction coil and the second induction coil of each sensor pair are wound and/or connected to:
(i) produce outputs that are representative of a detected magnetic flux therein, and
(ii) collect magnetic flux with opposite currents within each of the pair of coils;

wherein the sensor is configured to detect signals at frequencies that are not attenuated by walls or metallic sheets, such that placement of the sensors inside metallic or non-metallic enclosures or hidden behind walls yield signatures from electromagnetic fields of firearms, IEDs and knives from the one or more objects; and a computing device operably connected to the one or more sensors and configured to:
receive the electrical signals;
generate signatures for one or more moving conductive objects based on the magnetic flux using a Pythagorean sum of the x-axis, y-axis and z-axis, the signatures being representative of a potential weapon type;
determine, based on (i) the signatures and (ii) using a 70 pT/Hz1/2 sensor floor noise to the signals coming from the sensors/paired sensors, whether each of the one or more moving conductive objects meets a predetermined electromagnetic field profile based on the electrical signals; and
present a notification to a user in response to determining that one of the objects meet the predetermined electromagnetic field profile.

2. The system of claim 1, wherein the one or more induction coils each include a core made of one of low carbon steel, ferrite, an alloy of nickel-iron, and an alloy of boron-iron-silicon.

3. The system of claim 1, wherein the one or more sensors comprise a pair of solenoids.

4. The system of claim 1, wherein the one or more sensors comprise at least two sensors configured to detect magnetic flux of the one or more objects in different orientations, and
wherein the electrical output is representative of the detected magnetic flux.

5. The system of claim 1, wherein the received electrical signal represents a magnetic field generated by one of the objects, and
wherein the computing device is configured to determine whether the one of the objects meets the predetermined electromagnetic field profile based on the magnetic field generated by the one of the objects.

6. The system of claim 1, wherein the computing device comprises a frequency filter configured to substantially remove electrical signals from the electrical signals output by the one or more sensors that are outside a predetermined range of frequencies.

7. The system of claim 1, further comprising an image capture device, and
wherein the computing device is configured to control the image capture device to capture an image of one of the objects and provide the image to a user in response to a determination that a representation of the electromagnetic field of the one of the objects meets the predetermined electromagnetic field profile.

8. The system of claim 1, wherein the computing device is configured to determine whether each of the one or more objects meets a predetermined profile based on:
a predetermined electromagnetic field profile; and
a location in space.

9. The system of claim 8, wherein the computing device is further configured to determine whether each of the one or more objects meets a predetermined profile based on visual classification of the object.

10. The system of claim 8, wherein the computing device is further configured to determine whether each of the one or more objects meets a predetermined profile based on motion of the object.

11. The system of claim 9, wherein visual classification of the object is performed by the computing device.

12. The system of claim 9, wherein visual classification of the object is performed by a person who receives the image from the computing device.

13. The system of claim 7, further comprising a display configured to display the captured image to a user.

14. The system of claim 1, wherein the predetermined electromagnetic field profile comprises a profile of a weapon or a destructive device.

15. The system of claim 1, wherein the computing device is configured to:
maintain a library of a plurality of predetermined electromagnetic field profiles for comparison to signals representative of detected electromagnetic fields of the one or more obj ects;
compare the predetermined electromagnetic field profiles to each of the signals representative of the detected electromagnetic fields; and
present the notification in response to any of signals matching one of the predetermined electromagnetic field profiles.

16. The system of claim 15, wherein the comparison of the predetermined electromagnetic field profiles to each of the signals representative of the detected electromagnetic fields occurs through the use of machine classification algorithms.

17. The system of claim 1, wherein the computing device is further configured to determine whether each of the one or more objects meets a predetermined profile based on motion of the object.

18. The system of claim 17, wherein the computing device comprises a frequency filter configured to substantially remove electrical signals from the electrical signals output by the one or more sensors that are outside a predetermined range of frequencies.

19. The system of claim 17, further comprising an image capture device, and
wherein the computing device is configured to control the image capture device to capture an image of one of the objects and provide the image to a user in response to a determination that a representation of the electromagnetic field of the one of the objects meets the predetermined electromagnetic field profile.

20. The system of claim 17, wherein the computing device is configured to determine whether each of the one or more objects meets a predetermined profile based on:
a predetermined electromagnetic field profile; and
a location in space.

21. The system of claim 20, wherein the computing device is further configured to determine whether each of the one or more objects meets a predetermined profile based on visual classification of the object.

22. The system of claim 20, wherein the computing device is further configured to determine whether each of the one or more objects meets a predetermined profile based on motion of the object.

23. The system of claim 21, wherein the visual classification of the object is performed by the computing device.

24. The system of claim 21, wherein the visual classification of the object is performed by a person who receives the image from the computing device.

* * * * *